March 13, 1962   L. P. ENGLUND   3,024,719
APPARATUS FOR BALING
Filed Sept. 1, 1960   6 Sheets-Sheet 1
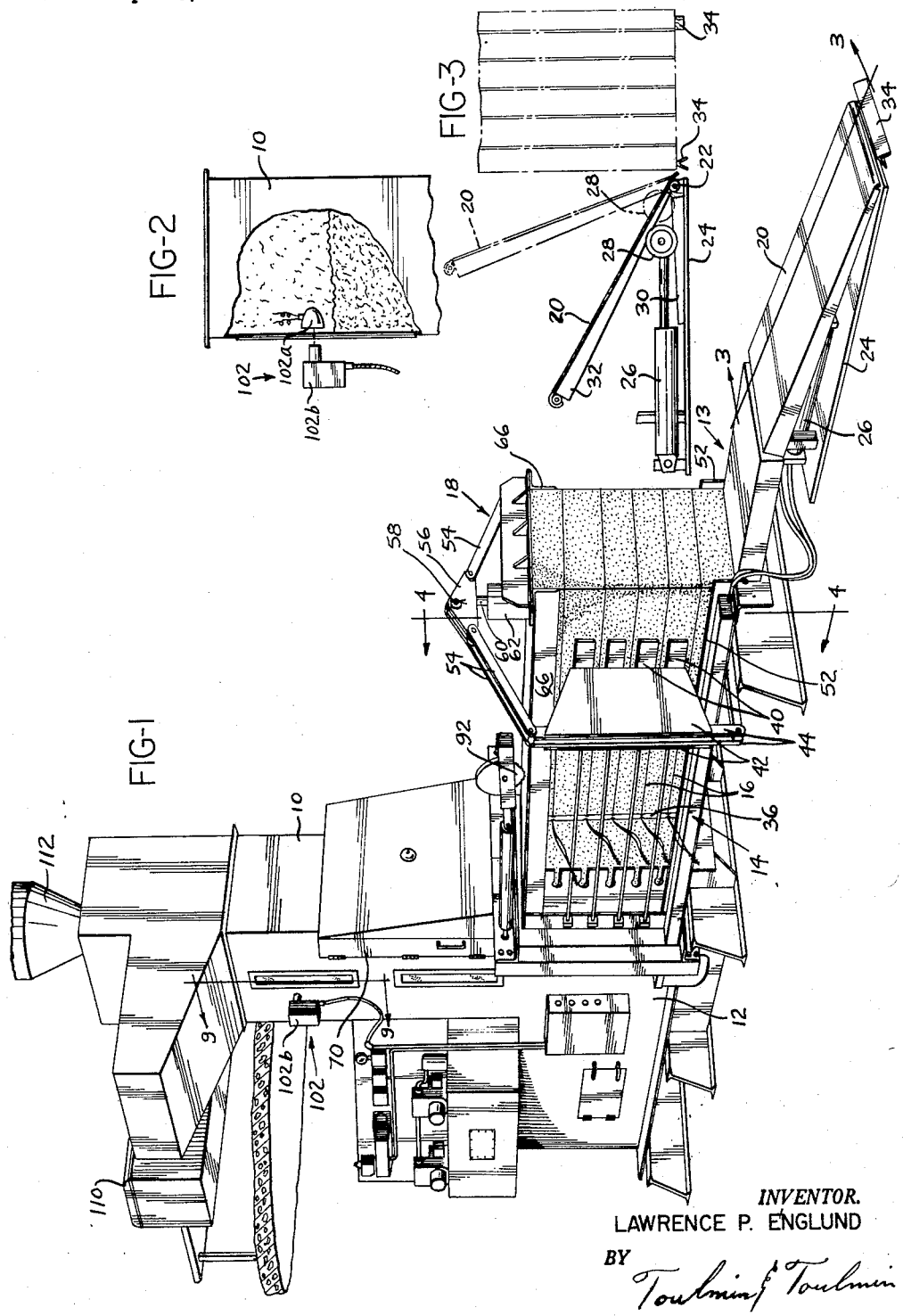
INVENTOR.
LAWRENCE P. ENGLUND
BY
ATTORNEYS

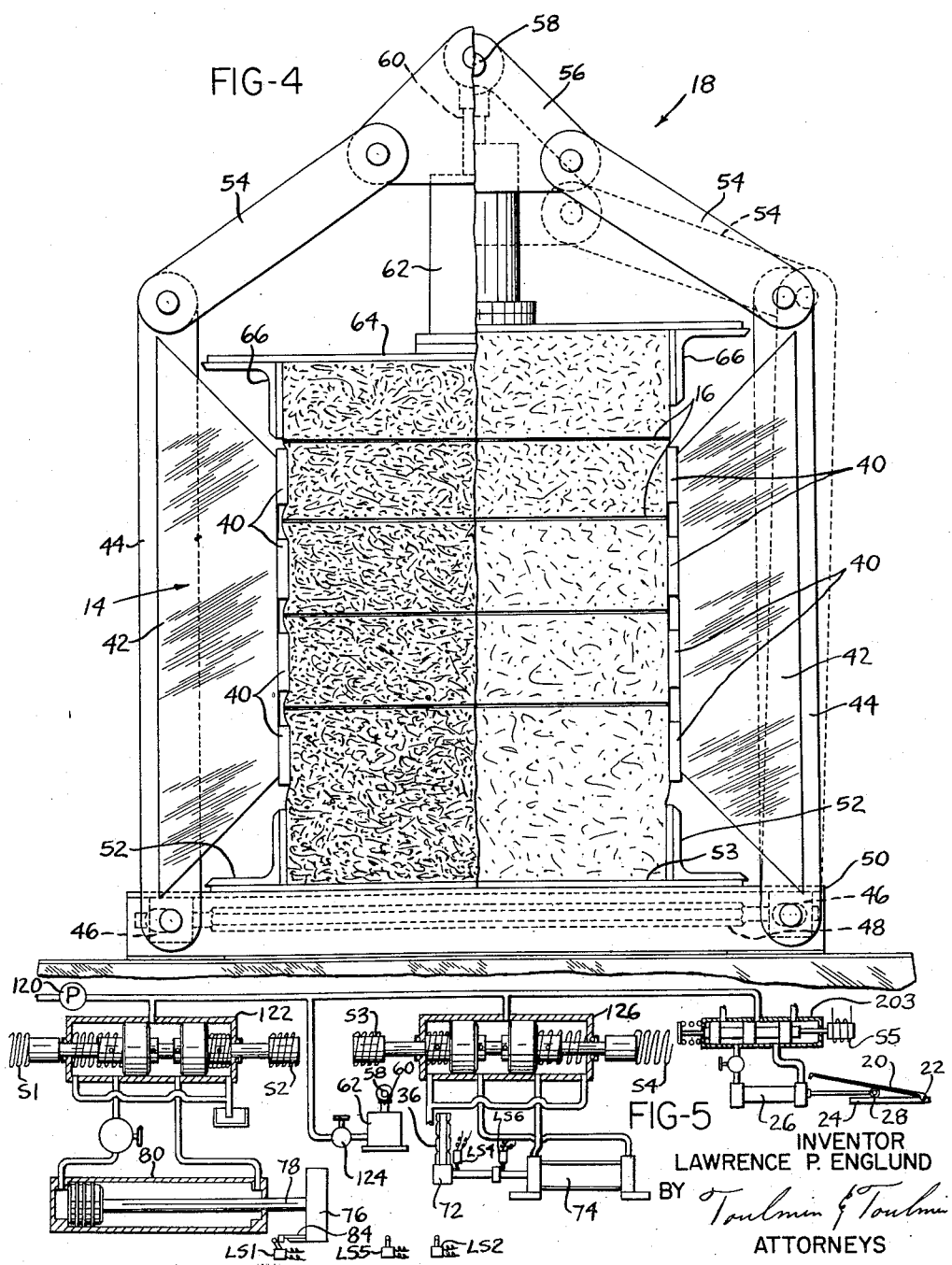

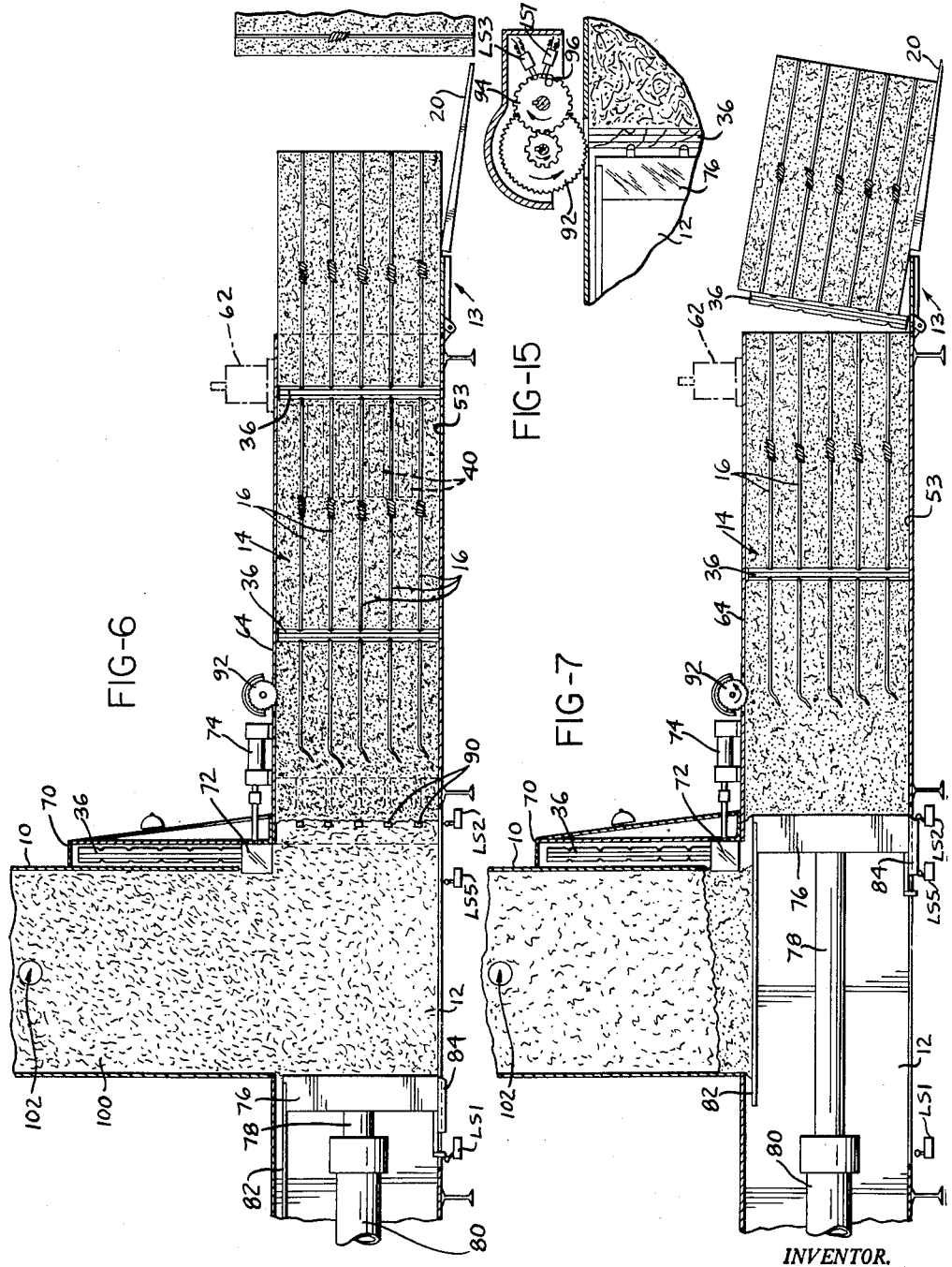

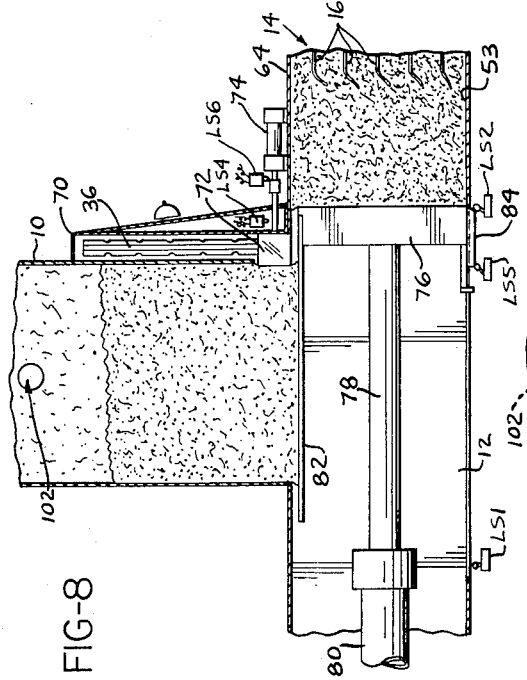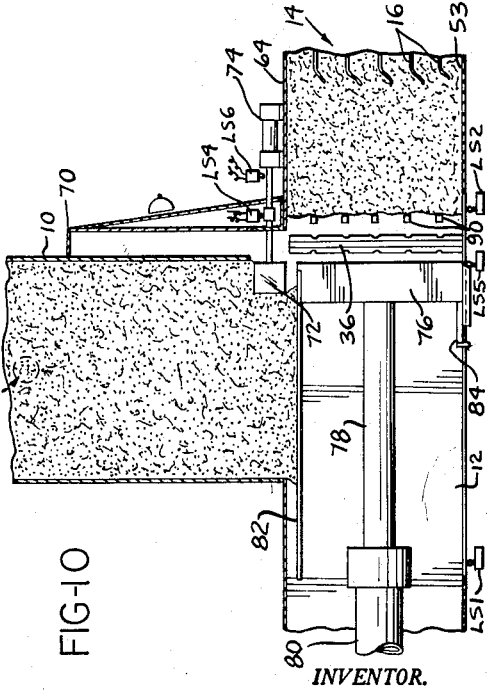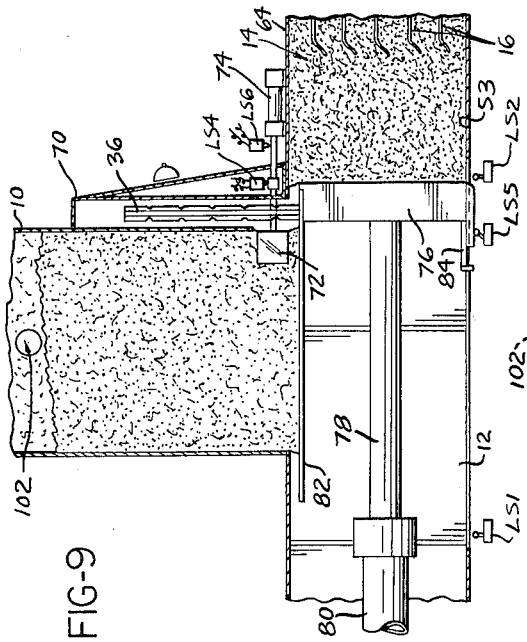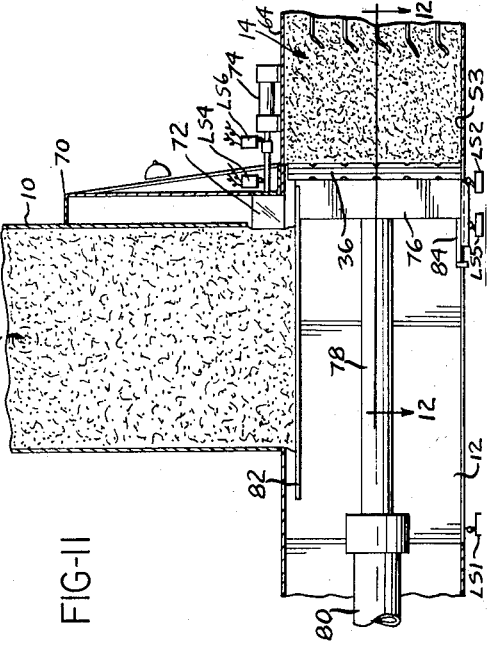

March 13, 1962 — L. P. ENGLUND — 3,024,719
APPARATUS FOR BALING
Filed Sept. 1, 1960 — 6 Sheets-Sheet 5
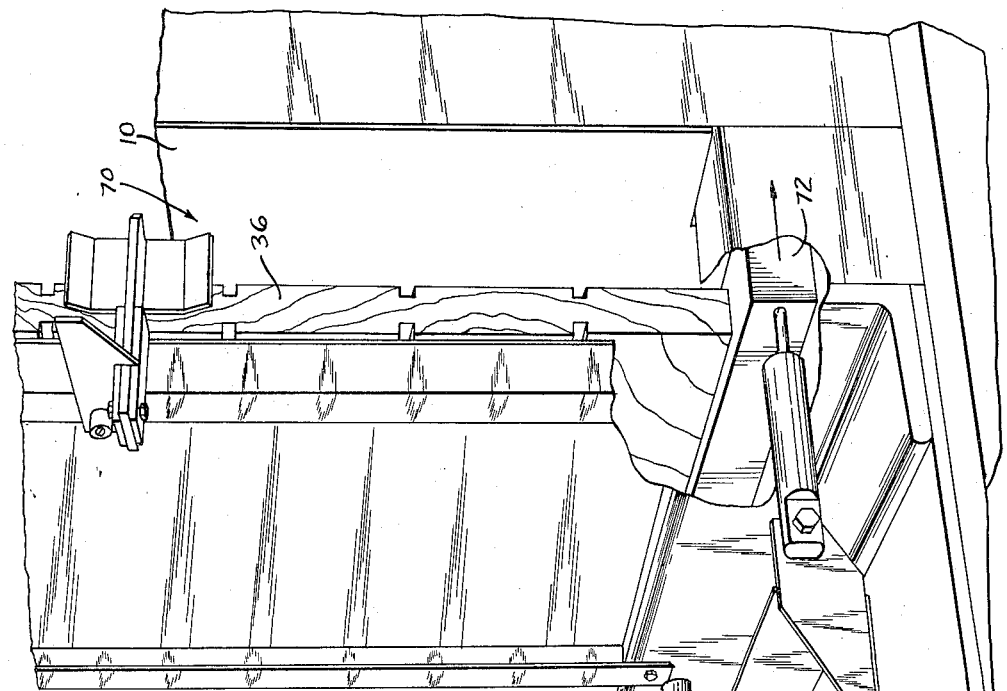
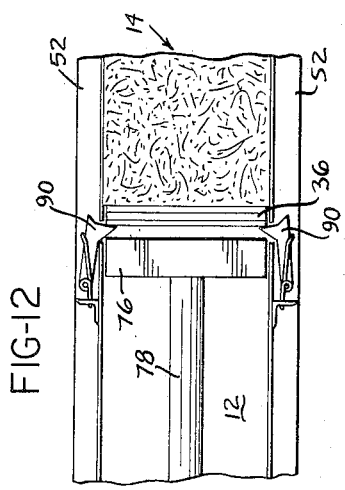
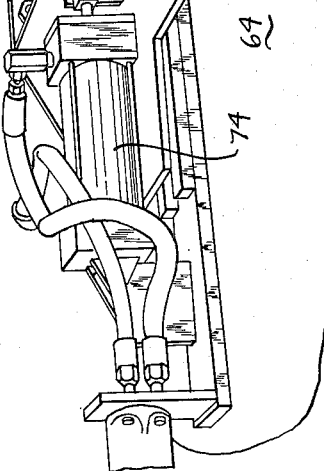
INVENTOR.
LAWRENCE P. ENGLUND
BY Toulmin & Toulmin
ATTORNEYS March 13, 1962     L. P. ENGLUND     3,024,719
APPARATUS FOR BALING
Filed Sept. 1, 1960     6 Sheets-Sheet 6

INVENTOR.
LAWRENCE P. ENGLUND
BY Toulmin & Toulmin
ATTORNEYS

United States Patent Office 3,024,719
Patented Mar. 13, 1962

3,024,719
APPARATUS FOR BALING
Lawrence P. Englund, Bellevue, Ohio, assignor to The American Baler Company, Bellevue, Ohio, a corporation of Ohio
Filed Sept. 1, 1960, Ser. No. 53,531
8 Claims. (Cl. 100—44)

This invention relates to balers and is particularly concerned with balers for baling shredded waste paper and other industrial refuse of this nature. More particularly still, the present invention is concerned with the forming into bales of extremely finely shredded paper materials and the like such as might be encountered in government offices and similar installations where severe security regulations are maintained.

Baling machines for baling waste paper and other industrial refuse and the like including metal scrap are known and are generally used for the purpose of forming the material into bales which can easily be handled while they are being transported to a place where the material is to be reprocessed.

A particular problem has been existing, however, with the baling of paper that has to be shedded to an extremely fine condition, as might be required by security regulations, for example, on account of the difficulty of packing the bales solid enough and getting the material into the baling chamber uniform enough that the bale when completed was uniform in shape and has all of the shredded material firmly bound therein. A bale that is not uniform in density from side to side might have the top thereof, for example, less densely compact than the bottom, and this could cause the bale to be a "roller" so that it could be difficult to handle, and further, the shredded material could easily start to fall out from the soft side of the bale and the entire bale disintegrate during handling.

The extremely fine shedding of paper and similar materials in addition to being necessary in view of security regulations also is of advantage in connection with the processing of the shedded paper in a paper mill when the bales are delivered thereto for making use of the baled scrap. Extreme finely shredded paper, since it requires less beating and other processing before it is made up into paper stuff, is more valuable to the paper mills and bales of this nature thus can command a higher price.

Having the foregoing in mind, it is a primary object of the present invention to provide an improved baling mechanism, particularly for the baling of finely shredded paper scrap, which will produce improved bales.

Another object is the provision of a baling mechanism for baling shredded paper and the like which will be automatic in operation and which will produce uniform compact bales of uniform density and size.

Still another object of this invention is the provision of a baling machine having a greatly improved block dropping arrangement therein which facilitates in making the baling machine work smoothly on an automatic cycle and insures that the dropped block will be in the proper position without requiring checking by the baling machine operator.

Still a further object of this invention is the provision of a baling machine which is so certain in operation that a single operator can operate the baling machine and a shredding machine for supplying shredded paper thereto which may be located on a floor above the baling machine.

It is also on object of this invention to provide, in combination with a baling machine, a novel device for upending the bale after it has been expelled from the baling machine for greater ease in handling.

Other objects of this invention become more apparent upon reference to the following specification taken in connection with the accompanying drawings, in which FIGURE 1 is a perspective view giving an overall picture of the combination of a baler according to this invention and a shredder associated therewith for supplying shredded material, such as paper, to the baler, FIGURE 2 is a fragmentary view through the hopper of the baling machine partly broken away to show a photocell control means pertaining to the baling machine, FIGURE 3 is a sectional view indicated by line 3—3 on FIGURE 1 showing the bale upending structure at the discharge end of the baling machine, FIGURE 4 is a transverse sectional view indicated by line 4—4 on FIGURE 1 showing the means at the discharge end of the baling press for restricting the passage of the bale so that compacting pressure can be developed in the baling chamber, FIGURE 5 is a diagrammatic representation of the hydraulic control circuit for the baling press showing the motor for reciprocating the baling head and the control valve therefor, and also showing the block dropping motor and the control therefor, FIGURE 6 is a longitudinal sectional view through the baling machine showing the baling head retracted and the hopper filling preparatory to another compacting movement of the baling head.

FIGURE 7 is a view like FIGURE 6, but shows the baling head advanced to its extreme forwardmost position, FIGURE 8 is a fragmentary view like FIGURE 7 with the baling head advanced and with the hopper filling, FIGURE 9 is a fragmentary view like FIGURE 8, but shows the block support member shifted so that a block drops on top of the baling head, FIGURE 10 is a view like FIGURE 9, but shows the baling head retracted to an intermediate stopped position and the block dropped ahead of the baling head, FIGURE 11 is a view similar to FIGURE 10, but shows the baling head advanced after the block has dropped so that the block is pushed forwardly to be engaged by the dogs that extend into the baling chamber from the side, FIGURE 12 is a plan sectional view indicated by line 12—12 on FIGURE 11 showing the manner in which the dogs engage the block so the baling head can retract after positioning the block in place, FIGURE 13 is a perspective view showing more or less diagrammatically the block dropping mechanism and the actuating motor therefor, FIGURE 14 is a diagrammatic representation of the electrical control circuit by means of which the baling machine is controlled, and FIGURE 15 is a view of a bale length measuring wheel.

Reference is made to the drawings somewhat more in detail and with particular reference to FIGURE 1 the baling machine embodying the present invention comprises a hopper 10 through which shredded paper and the like is delivered into a chamber 12 in the baling machine through which the material is pushed by a compacting head into an elongated baling chamber generally indicated at 14. The baling chamber is open on the sides so that banding wires 16 can be placed around the bales as they are moving through the baling chamber.

A constructing mechanism generally indicated at 18 restricts movement of the bales from the discharge end of the baling chamber and thus causes a predetermined baling pressure to be built up on the material thereby arriving at the proper degree of compactness.

When the bales are discharged from the baling chamber, they are delivered to an upending mechanism consisting of a platform 20 pivoted at 22 to a base member 24. A hydraulic motor 26 also pivoted to base member 24 has roller means 28 engaging track means 30 on base means 24 and 32 on platform 20 so that energization of the motor will drive the roller means 28 toward pivot 22 thus tilting platform 20 upwardly and upending a bale thereon. Preferably, spacer means 34 are provided so that the upended bale is spaced from the floor whereby a fork-lift truck or the like can be used for picking up and transporting the bales.

The bales in the baling chamber are separated by blocks 36 of conventional type which may consist, for example, of wooden blocks having lateral grooves through which the banding wires 16 are passed while the bales are in the baling chamber. These blocks may be faced with cardboard sheets or the like which may be retained under the wires at the ends of the bales if so desired.

The constricting mechanism 18, referred to above, is shown more in deail in FIGURE 4 wherein it will be seen that the discharge end of the baling chamber is provided with side rails 40 on each side that are connected together by vertical plates 42 attached to arms 44, which at their lower ends are pivoted to blocks 46 interconnected by the rod 48 having oppositely threaded portions at its opposite ends engaging the blocks 46. This arrangement provides for the blocks to be moved toward or away from each other to determine the lateral spacing of the rails 40 and thus to determine to a degree, the restriction offered to the passage of the bale and the final size of the bales.

Blocks 46 are prevented from moving upwardly by the frame member 50 of the baler frame. This frame member also supports the angles 52 that form the lower side edges of the baling chamber and also supports plate 53 that forms the bottom wall of the baling chamber.

At their upper ends bars 44 are pivoted to links 54 that extend inwardly and upwardly and are pivoted to a triangular connector member 56 that, in turn, is pivoted at 58 to ram 60 of a hydraulic motor having cylinder 62 resting on top plate 64 of the baling chamber and which top plate supports on its underneath side angles 66 forming the top side edges of the baling chamber and corresponding to the angles 52 previously referred to. Top plate 64 is movable vertically when fluid under pressure is supplied to cylinder 62 to drive its ram 60 upwardly. The arrangement is such that the top plate of the baling chamber is pushed downwardly while the bars 40 at the side are pulled inwardly, thus restricting the bale on all sides.

In FIGURE 4 the right side of the view shows the tensioning device relaxed, while the left side of FIGURE 4 shows the tensioning device when it is actuated and it is restricting the bale passing through the baling chamber.

The general arrangement of the baling head and hopper and the baling chamber will be more clearly seen in FIGURE 6. In this figure, it will be noted that the previously referred to block 36 is contained within a block dropper compartment 70 mounted on the front side of hopper 10 and positioned so that the block will drop vertically downwardly at the rear end of the baling chamber. The block is supported on a reciprocating support member 72 which is adapted for advancing inwardly of the hopper in order to release the block so that it can drop downwardly. The direction of movement of support member 72 is of most importance because it clears the adjacent bottom corner of the hopper of material, thus permitting the block to drop freely without there being any interference on account of shredded material getting underneath the blocks. A reciprocating hydraulic motor means 74 is mounted on top plate 64 of the baling chamber and is reversibly energizable for moving support member 72.

FIGURE 6 will also reveal that the baling head 76 is mounted on the ram 78 of a hydraulic motor having a cylinder 80 mounted in the frame of the machine so that the baling head can be reciprocated between its retracted position in which it is illustrated in FIGURE 6 and its advanced position in which it is illustrated in FIGURE 7.

The baling head has a closure plate 82 mounted on the top thereof which closes the bottom of hopper 10 when the baling head is advanced to its FIGURE 7 position so that no shredded material will fall behind the baling head. The baling head also has a cam member 84 attached thereto which extends through a slot in the bottom of the baling chamber, or through a slot in any other convenient location for actuation of the several limit switches, LS1, LS2, and LS5, which are positioned adjacent the baling chamber.

The baling head when in its fully advanced position has at least its front face positioned forwardly of the dogs 90 which, as will be seen in FIGURE 12, are pivotally supported on the sides of the baling chamber and have projections extending into the baling chamber so that material being baled and the separating boards will be engaged thereby and prevented from moving backwardly in the chamber when the baling plunger retracts.

The machine is made automatic by providing a bale measuring mechanism which is illustrated in FIGURE 15 and which comprises a toothed or serrated wheel 92 bearing through an opening in the top wall of the baling chamber on bale being pushed therethrough. This measuring wheel is geared to a gear 94 having a cam element 96 adapted for engaging and actuating the limit switches LS3 and LS7 in that order as the measuring wheel rotates.

Reference to FIGURES 6 through 11 will show the baling machine in its several operative positions.

FIGURE 6 shows the baling head completely retracted with the material to be baled, indicated at 100, dropping into the baling chamber.

FIGURE 7 shows the baling head in its fully advanced position with its material now building up on plate 82.

Figure 14:
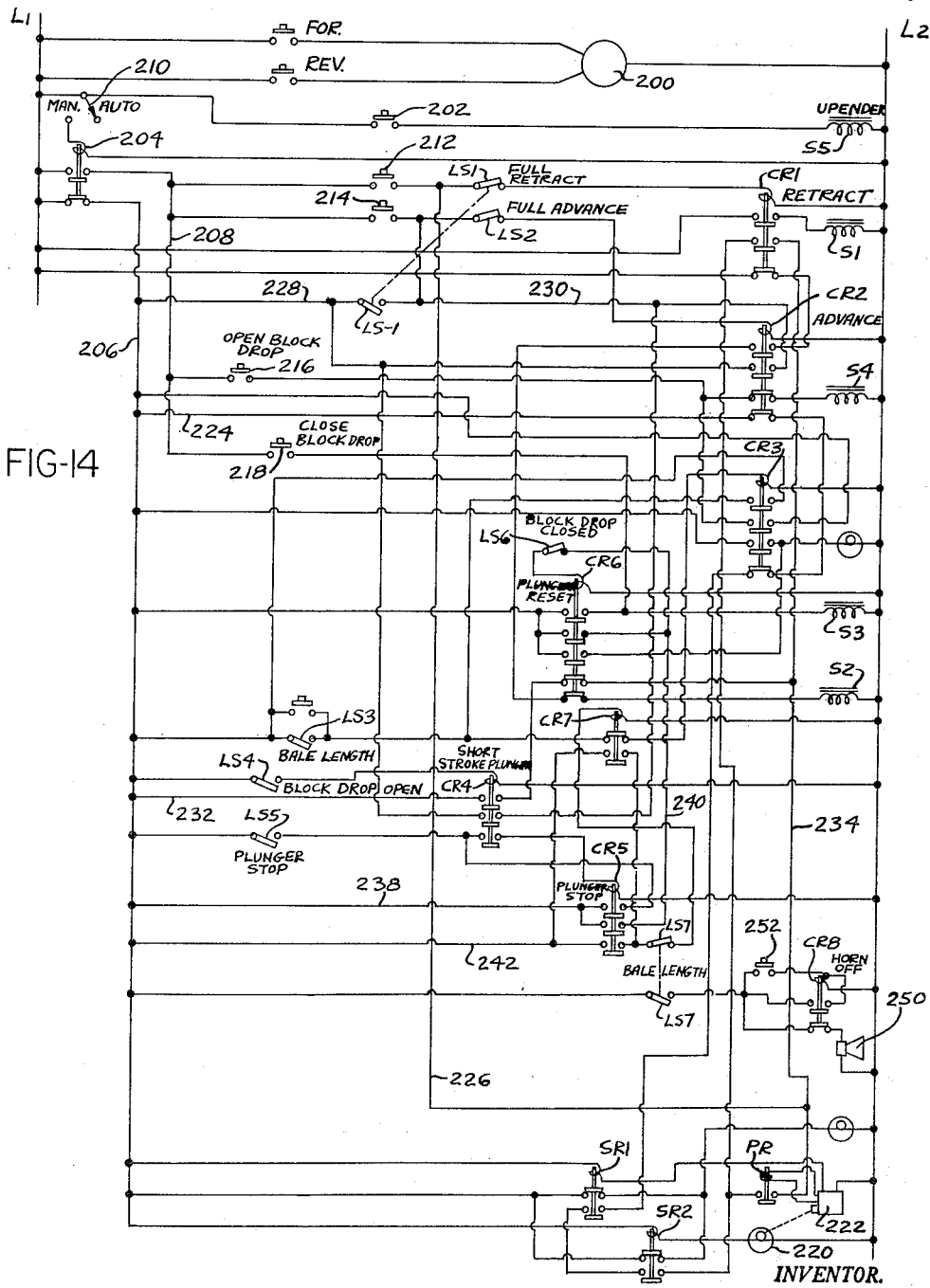

FIGURE 8 shows the machine in the same position except that the material is built up considerably higher in the chamber and is approaching the photocell control unit 102 positioned in the hopper wall as illustrated in FIGURE 2. This unit comprises a light source and photocell 102A and 102B according to conventional practices and is so arranged that the baler remains idle until the material in the hopper builds up high enough to interrupt the light beam to the photocell.

As the bale builds up to the required length, as indicated by the measuring wheel 92, the hydraulic motor 74 is actuated as in FIGURE 8 to move the block support member 72 inwardly of the hopper thereby to drop the block on top of the baling head. The baling head can now retract to its FIGURE 10 position wherein it halts permitting the block to drop downwardly to the bottom of the baling chamber. It will be noted that the space through which the block moves is completely free of shredded material on account of the block support member 72 having moved inwardly of the hopper and on account of the baling head thereafter retracting. The block can thus drop to its lowermost position and whereupon the baling head again advances rightwardly to its FIGURE 11 position pushing the block past the dogs 90 so that when the baling head again retracts the block will remain in place and form a base against which the next bale will be built up.

The supply of material to the hopper 10 can be accomplished by passing material to be baled through a shredder 110 which may be located on the next floor above the baling machine. Material may also be supplied to a hopper from a collection system by means of a cyclone separator 112 of conventional design within which the shredded material is separated from the conveying air so the material can drop into the hopper while the air passes out through the top of the cyclone separator.

Since a single operator can operate the baling machine according to this invention, there are preferably provided signal means adjacent the shredder for indicating when a bale is to be banded. This is done after a block is dropped into the baling chamber, and at the same time a new block can be inserted into the block holder.

Normally, the operation of the baler is completely automatic, with the baling head carrying out a baling stroke only when sufficient material is accumulated in the hopper to supply a charge to the baling chamber. On account of this automatic control, and the high degree of compacting of the materials, accomplished by the baler of this invention, considerable time may elapse between banding operations. Visible and audible signals are thus important for alerting the operator to the necessity for banding a bale and putting a new block in the block dropper.

The hydraulic operating circuit is illustrated in FIGURE 5 where it will be seen that there is a pump 120 which supplies pressure fluid to the inlet of a four-way reversing valve 122 which has service ports connected to opposite ends of cylinder 80 pertaining to the baling head. This valve is normally centered to block fluid in cylinder 80 and is movable in one direction by energization of solenoid S1 to cause retracting movement of the baling head and is movable in opposite position by a solenoid S2 into position to cause advancing movement of the baling head. Pump 120 also supplies pressure fluid to the inlet of a four-way reversing valve 126 connected with the opposite ends of the block dropper hydraulic motor 74. Cylinder 62 is connected via pressure regulating valve 124 with pump 120.

FIGURE 14 shows, somewhat diagrammatical, an electric control circuit for controlling the baling machine of the present invention.

In FIGURE 14 the main power lines are indicated at L1 and L2. Connected between these power lines is the drive motor 200 of the shredder 110 which has both forward and reverse control switches as is customary in connection with shredder motors.

There is also connected between the power lines a control switch 202 that controls the solenoid S5 pertaining to the spring return valve 203 associated with the upender motor 26.

There is also connected between the power lines, the coil of a relay 204, which when deenergized connects power line L1 with a wire 206 for automatic operation of the baling machine. When the relay is energized, power line L1 is connected with a wire 208 which provides for manual operation of the baler. A switch 210 is operable for determining when the relay is energized or deenergized.

Assuming the relay 204 to be energized, manual operation of the baler can be had by the several push buttons in the circuit. Since the bales normally rest with the baling plunger advanced, the first step in manual operation of the baling machine would be the closing of a push button 212 which will cause energization of a contactor CR1. This contactor is effective, through a blade thereof, to cause energization of solenoid S1 pertaining to valve 122 to cause retraction of the baling plunger. The relay has a holding circuit through a second blade thereof which will be interrupted by opening of a limit switch LS1 which is positioned to be opened by the baling plunger at the end of its reaction stroke.

The baling plunger can be caused to advance by closing a switch 214. It brings about energization of a relay CR2. This relay has a blade in circuit with a normally closed blade of relay CR1, a normally closed blade of a relay CR6, and the solenoid S2 pertaining to valve 122 so that closing of relay CR2 will bring about advancing of the baling plunger. This relay has a holding circuit extending through a limit switch LS2 adapted for being opened by the baling plunger when it reaches its foremost advanced position.

Another push button 216 is operable for closing a circuit through a normally closed blade of relay CR2 and solenoid S4 pertaining to valve 126 of the block dropper. Solenoid S4 will be energized only so long as switch 216 is closed.

Still another switch 218 is in circuit with a solenoid S3 pertaining to valve 126 which will shift the valve in a direction to close the block dropper.

When switch 210 and relay 204 is deenergized, the aforementioned push buttons are ineffective because wire 208 is disconnected by power line L1 and wire 206 is, instead, the effective wire. With relay 204 deenergized, the operation of the baling machine, with the exception of the manual banding of the bales, is entirely automatic. The baling machine operates on cycles consisting of a retraction of the baling plunger followed immediately by an advancing movement thereof. Each cycle is initiated by the photocell device in the hopper which indicates when there is a charge of material in the hopper at least sufficient to fill the baling chamber ahead of the baling plunger. The cycles of operation of the baler might thus occur at spaced intervals depending on the rate of supply of material to the hopper. Since the plunger dwells in its advanced position with the reversing valve for the baling plunger motor in centered position, the hydraulic circuit can substantially be unloaded and thereby a considerable amount of power conserved.

Turning now to the electrical circuit and with reference to automatic operation of the baling machine, deenergization of relay 204 to connect wire 206 to power line L1 establishes a circuit through the coil of a relay SR2 and the light bulb 220 of the photocell and light combination in the hopper. Relay SR2 will close only if light 220 is in operating condition.

There is also a circuit established to the coil of a relay SR1 and the photocell unit generally indicated at 222 so that relay SR1 will close only if the photocell unit is in operative condition. Pertaining to the photocell unit 222 is a relay PR which will become energized when the photocell in the photocell unit is darkened.

Assuming now that the baling plunger is resting in its advanced position, and that material is accumulating in the hopper, these conditions will obtain until the material interrupts the light beam between lamp 220 and the photocell unit. When this light beam is interrupted, relay PR closes and a circuit will be established from wire 206 through a wire 224, a normally closed blade of the advanced relay CR2, a normally closed blade of the block dropper relay CR3, a blade of SR1, a blade of SR2, the blade of PR, and thence through wire 226 back through limit switch LS1 and the energizing coil of CR1.

This will close relay CR1, and this will cause energization of solenoid S1 which will cause retracting movement of the baling plunger. When the baling plunger reaches its rearmost position, it will open the blade of LS1 in circuit with the relay CR1 to caused deenergization thereof and which will also deenergize valve solenoid S1. At the same time, however, a second blade on limit switch LS1 will be closed that will establish a circuit from wire 206 through the now closed second blade of LS1 and through limit switch LS2 to the coil of the advance relay CR2. Relay CR2 is thus energized and this will establish a circuit, as mentioned before, through a normally closed blade of the now energized CR2, a normally closed blade of deenergized CR6, and the valve solenoid S2.

The baling plunger will now advance until it reaches its advanced position at which time switch LS2 is opened to interrupt the holding circuit for relay CR2 thereupon this relay and valve solenoid LS3 are energized.

At this time, as the photocell is illuminated relay CR2 will be opened and the baling machine will remain at rest with the baling plunger advanced. A new cycle according to the foregoing cycle will be had whenever the photocell is darkened, so that the rate of operation of the baling machine will depend entirely upon the rate of supply of material thereto.

After a predetermined number of the compacting cycles described above, there will be enough material in the baling chamber to form a bale. The movement of the material through the baling chamber is measured by the bale measuring device of FIGURE 15 and when the desired amount of material has been pushed into the baling chamber, this measuring device is operable, by means of its cam 96, to close a limit switch LS3.

Since the material is compacted to a high degree within the baling chamber, the movement of the bale measuring device to operate the limit switch LS3 will always occur when the baling plunger is moving in the advancing direction and approaching its foremost position.

When limit switch LS3 is closed, a circuit is established from wire 206 through the said limit switch and through a normally closed blade of a deenergized relay CR7 and the energizing coil of relay CR3. This relay closes and establishes its own holding circuit. Closing of relay CR3 also opens the aforementioned normally closed blade thereof that is in circuit with the photocell relay PR so that this photocell relay is now bypassed and ineffective so that even if the light beam is interrupted to the photocell, the baling plunger will not retract.

Energization of relay CR3 also closed a blade that establishes a circuit from wire 206 through a wire 226 and a normally closed blade of deenergized relay CR2 to the valve solenoid S4 that causes opening of the block dropper. This will cause a block to drop on top of the advanced plunger. When the block dropper reaches its opened position it closes a limit switch LS4 that is in circuit with the energizing coil of a relay CR4 so that this relay closes.

This relay when energized establishes a circuit from wire 228 through a blade of relay CR4 and then back to a wire 230 and then through limit switch LS2 to the coil of advance relay CR2. This relay will close but is ineffective for causing energization of valve solenoid S2 because at this time relay CR1 also closes and this interrupts a circuit to the valve solenoid.

The closing of relay CR1 comes about because the closing of relay CR4 establishes a circuit from wire 232 through a normally opened blade of the said relay and then through a normally closed blade of deenergized relay CR6 and then through wire 234 to wire 226 and thence through limit switch LS1 to the coil of relay CR1. Relay CR1 will close and this will energize valve solenoid S1 to cause retraction of the baling plunger. The retracting movement of the baling plunger under these conditions, however, is interrupted after it has moved back far enough to permit the block to drop ahead of the baling plunger.

This is accomplished by positioning limit switch LS5 to be engaged and closed by the baling plunger when it has retracted the desired distance. The closing of limit switch LS5 is effective, through a blade of energized relay CR4 to bring about energization of relay CR5. Closing of relay CR5 will establish a circuit from wire 206 through a wire 238 and a closed blade of energized relay CR5 to a wire 240 that leads through a limit switch LS6 and the coil of relay CR6.

Limit switch LS6 is normally closed and is opened by the block dropper when the latter closes. Closing of relay CR6 establishes a circuit through one of its blades to valve solenoid S3 which will bring about closing of the block dropper and which closing of the block dropper, on account of the opening thereby of limit switch LS6, is accompanied by deenergization of relay CR6.

In the interval that relay CR6 is energized, however, it interrupts the circuit to the retract relay CR1 so that this relay drops out and interrupts the retracting movement of the baling plunger. As soon as relay CR6 is deenergized by the closing of the block dropper, it closes the blade that is in circuit with the advance solenoid S2 so that this solenoid, on account of the condition of energization of relay CR2 and of deenergization of relay CR1, brings about advancing movement of the baling plunger.

The aforementioned energization of relay CR5 also establishes a circuit from wire 206 through a wire 242 and a blade of relay CR5 and a normally closed blade of a limit switch LS7 to the coil of relay CR7 to cause energization of the said relay. Closing of relay CR7 opens a blade thereof in series with limit switch LS3 so that the bale measuring circuit is now rendered ineffective. CR7 also has a holding circuit through a blade thereof so that it will remain energized even after CR5 becomes deenergized and which occurred at the time the block dropper closed.

The original operating conditions of the baling press have now been restored with the exception of relay CR7 being energized. Accordingly, the baling machine continues to operate on its automatic cycle in the same manner as before, excepting now, there is a dividing board or block being pushed through the baling chamber.

After this block has advanced to the point that the bale can be banded, the bale measuring device operates switch LS7. This also occurs on the advancing movement of the baling plunger. Operation of switch LS7 will deenergize relay CR7 and simultaneously will close a circuit to a horn or other signalling device, preferably audible, or which may be both audible and visible, as indicated by reference numeral 250.

Where the operator of the baling machine is also operating the shredder, which may be on another floor, the horn signal will serve to indicate that it is time for banding a bale. When the operator comes down to the baling machine ready to band the bale, he may avail of a switch 252 which will energize a relay CR8 which will open the horn circuit while establishing a holding circuit for itself through switch LS7. After the bale has been banded, operation of the baling machine will continue and when cam 96 runs off limit switch LS7, the automatic horn signal circuit will be reset.

The foregoing overall cycle operates with the individual compacting cycle being controlled by the photocell unit and with the baling and block dropping cycles being controlled by the bale measuring device. It will be understood, at the time of banding a bale, the operator will place a new block in the block dropper so that the said block will automatically drop into the baling chamber when the bale measuring device again senses the length of a complete bale.

On account of the high degree of compacting of material obtained by the direct acting hydraulic motor attached to the baling plunger, and on account of the inwardly moving block dropper, it provides for uniform distribution of material over the cross section of the baling chamber, extremely uniform bales are produced. These bales even when formed of finely shredded material do not tend to deteriorate or to be "rollers," and, instead the bales are of uniform density and size and are regularly shaped.

Material can be baled which is shredded to a degree of fineness that will meet all security regulations and this material is, on account of its condition of being finely shredded, in ideal condition for processing in a paper plant.

On account of the full automatic nature of the operation cycle of the bale, it is adapted for being integrated into continuous manufacturing systems. This can easily be done by making certain the baler will handle somewhat more than the maximum rate of supply of material thereto so that the material will not tend to accumulate ahead of the baling machine.

It will be understood that this invention is susceptible to modification in order to adapt it to different usages and conditions; and, accordingly, it is desired to comprehend such modifications within this invention as may fall within the scope of the appended claims.

I claim:

1. In a baler; a baling chamber having a top wall, a hopper communicating with the chamber at one end from above through said top wall to supply material to be baled thereto, a baling plunger reciprocable across the end of the hopper and into the baling chamber to compress the material therein, a block support adjacent the hopper on the side toward which the plunger moves in its advancing direction, said block support comprising a member extending the width of the hopper at the bottom thereof substantially square in cross section and slightly longer on a side than the thickness of the block, said member having a lower horizontal face about coplanar with the top wall of the baling chamber and a vertical face about coplanar with the adjacent wall of the hopper, and means for moving the member inwardly of the hopper to drop a block resting thereon into said baling chamber, the said inward movement of the member clearing the space at the bottom of the hopper adjacent the space through which the block drops of material that might interfere with the free dropping of the block.

2. In a baling machine; a baling chamber, a baling plunger reciprocable in the chamber between retracted and advanced position therein, a hopper communicating with the baling chamber from above having its one side in substantial alignment with the face of said plunger in its retracted position and its opposite side positioned rearwardly of the advanced position of the face of the plunger, a block compartment on the outer face of said opposite side of the hopper, a block support member at the bottom of the compartment substantially square in cross section and extending substantially the width of the hopper normally closing the bottom of the compartment to support a block therein, said member being wider on each side than the thickness of a block, and means for moving said support member inwardly of the hopper to drop a block in said compartment that is resting thereon into the baling chamber.

3. In a baling machine; a baling chamber, a baling plunger reciprocable in the chamber between retracted and advanced position therein, a hopper communicating with the baling chamber from above having its one side in substantial alignment with the face of said plunger in its retracted position and its opposite side positioned rearwardly of the advanced position of the face of the plunger, a block compartment on the outer face of said opposite side of the hopper, a block support member at the bottom of the compartment substantially square in cross section and extending substantially the width of the hopper normally closing the bottom of the compartment to support a block therein, said member being at least as wide on each side as the thickness of a block, means responsive to the building up of a bale of predetermined length in the baling chamber for moving said support member inwardly of the hopper to drop a block on the top of the plunger, and means responsive to the dropping of said block to cause a retracting movement of said plunger from its advanced position a distance only slightly greater than the thickness of said block to permit the block to drop in front of the plunger.

4. In a baling machine; a baling chamber, a baling plunger reciprocable in the chamber between retracted and advanced position therein, a hopper communicating with the baling chamber from above having its one side in substantial alignment with the face of said plunger in its retracted position and its opposite side positioned rearwardly of the advanced position of the face of the plunger, a block compartment on the outer face of said opposite side of the hopper, a block support member at the bottom of the compartment substantially square in cross section and extending substantially the width of the hopper at the bottom thereof, said member being at least as wide on each side as the thickness of a block, means responsive to the building up of a bale of predetermined length in the baling chamber for moving said support member inwardly of the hopper to drop a block resting thereon on top of the plunger, and means responsive to the dropping of said block to cause a retracting movement of said plunger a distance only slightly greater than the thickness of a block to permit the block to drop in front of the plunger, followed by advancing movement of said plunger to push the block forwardly in the baling chamber.

5. In a baling machine; a baling chamber, a baling plunger reciprocable in the chamber between retracted and advanced position therein, a hopper communicating with the baling chamber from above having its one side in substantial alignment with the face of said plunger in its retracted position and its opposite side positioned rearwardly of the advanced position of the face of the plunger, a block compartment on the outer face of said opposite side of the hopper, a block support member at the bottom of the compartment substantially square in cross section and extending substantially the width of the hopper normally closing the bottom of the hopper, said member being at least as wide on each side as the thickness of a block, means responsive to the building up of a bale of predetermined length in the baling chamber for moving said block support member inwardly of the hopper to drop a block on the top of the plunger, and means responsive to the dropping of said block to cause a retracting movement of said plunger a distance only slightly greater than the thickness of a block to permit the block to drop in front of the plunger, followed by advancing movement of said plunger to push the block forwardly in the baling chamber, there being retaining dogs pertaining to the baling chamber engageable with said block to retain it in the baling chamber when pushed therein by said plunger.

6. In an automatic baling machine; a baling chamber, a baling plunger reciprocable in the baling chamber for compacting material therein, means for supplying material to the baling chamber in front of the baling plunger when the latter is in its retracted position, a block dropper positioned slightly rearwardly of the advanced position of the baling plunger operable when actuated to drop a block on top of the plunger so that block will drop into the baling chamber when the plunger is retracted, measuring means engaging the bale being built up forwardly of the advanced position of said plunger responsive to the building up of a bale of predetermined length for actuating said block dropper, other means including said measuring means responsive to the building up of a predetermined length of bale for energizing a signal and manual means for interrupting said signal.

7. In an automatic baling machine; a baling chamber, a baling plunger reciprocable in the baling chamber for compacting material therein, means for supplying material to the baling chamber in front of the baling plunger when the latter is in its retracted position, a block dropper positioned slightly rearwardly of the advanced position of the baling plunger operable when actuated to drop a block on top of the plunger so that block will drop into the baling chamber when the plunger is retracted, measuring means engaging the bale being built up forwardly of the advanced position of said plunger responsive to the building up of a bale of predetermined length for actuating said block dropper to drop a block on top of said plunger and for retracting said plunger a distance sufficient to permit the block to drop in front of the plunger and for then advancing said plunger, and said measuring means also being responsive to the building up of a predetermined length of bale for energizing a signal.

8. In a baler; a baling chamber, a hopper communicating with the chamber at one end from above to supply material to be baled thereto, a baling plunger reciprocable across the end of the hopper and into the baling chamber to compress the material therein, a stationary block compartment adjacent the hopper on the side toward which the plunger moves in its advancing direction, a movable member extending the width of the hopper at the bottom of said compartment, said member normally closing the bottom of said compartment to retain a block therein, and means for moving said member inwardly of the hopper to drop a block supported in the compartment on the member into the baling chamber, said member being operative on said inward movement to push material in the hopper at the bottom thereof inwardly of the hopper thereby to clear the space through which the block will drop.

References Cited in the file of this patent

UNITED STATES PATENTS

| | | | |
|---|---|---|---|
| 551,771 | Keith | Dec. 24, | 1895 |
| 760,117 | Hayes | May 17, | 1904 |
| 949,767 | House | Feb. 22, | 1910 |
| 1,084,735 | Groover | Jan. 20, | 1914 |
| 2,207,559 | Sylvester | July 9, | 1940 |
| 2,293,679 | Barker | Aug. 18, | 1942 |
| 2,327,067 | Russell | Aug. 17, | 1943 |
| 2,596,872 | Skromme | May 13, | 1952 |
| 2,619,150 | Smith | Nov. 25, | 1952 |
| 2,646,745 | Seltzer | July 28, | 1953 |
| 2,660,855 | Voight | Dec. 1, | 1953 |
| 2,799,129 | Huntley et al. | July 16, | 1957 |
| 2,910,932 | Wathen | Nov. 3, | 1959 |